United States Patent Office 3,437,557
Patented Apr. 8, 1969

3,437,557
ARRANGEMENT FOR PREVENTING SHUTDOWN OF A NUCLEAR REACTOR PLANT WHEN THE LOAD ON A TURBINE DRIVEN THEREBY DECREASES SUDDENLY
Arto Kaipainen, Ake Rullgard, Carl Gosta Skygge, and Cnut Sundqvist, Vasteras, Sweden, assignors to Allmänna Svenska Elektriska Aktiebolaget, Vasteras, Sweden, a Swedish corporation
Filed Apr. 3, 1967, Ser. No. 628,022
Claims priority, application Sweden, Apr. 7, 1966, 4,844/66
Int. Cl. G21d 7/00; G21c 19/00
U.S. Cl. 176—20        7 Claims

ABSTRACT OF THE DISCLOSURE

In connection with a nuclear reactor driving an electric generator through a turbine, to prevent shutdown if the electric network is suddenly disconnected, the steam in the reactor enclosure is led through rapidly opening valves opened in response to a sudden decrease in turbine load into a tank of water, after which these valves are closed and the steam is led through a dumping valve to a condenser connected to the turbine.

BACKGROUND OF THE INVENTION

Field of the invention

The present invention relates to a nuclear power plant having a boiling water reactor arranged in a reactor enclosure, from which reactor steam is led through a conduit to a turbine for the production of electric energy.

The prior art

In nuclear power plants constructed as so-called direct cycle boilers, that is where there is no heat exchanger between the reactor unit and the turbine, it has so far been impossible upon a sudden disconnection of the electric network at full load to prevent a rapid shutting down of the reactor due to the rapidly increasing pressure in the steam system. A rapid shutting down of the reactor, however, means that it takes a considerable time, about 24 hours, before the plant can be started again and reconnected to the network. The consequences of a relatively short disruption in the electric network have thus been considerable in equipment of this type. At a cutout of the network when the equipment is running at relatively low power it has been possible to avoid a rapid shutting down of the reactor by conducting away the excess steam to the condenser arranged in connection with the turbine. However, this condenser is not normally intended to be momentarily loaded with the large quantity of steam which must be conducted away upon a network disconnection at full load. The speed of the steam through the condenser tubes becomes so great that the tube strength is in danger. It is impractical both from the technical and economical points of view to make the condenser so that it could be used for this purpose and prevent an immediate reactor shut down upon a disconnection of the network even when the plant is running at full power. Furthermore, the dumping valve and its control equipment would in that case be extremely expensive. The main purpose of the invention is, in a boiling water reactor plant having a direct steam cycle, to avoid the mentioned disadvantages and thus, upon a network disconnection at full load, prevent a rapid shutting down of the reactor by relatively simple means.

In known equipment of this type a water basin is usually arranged inside the reactor enclosure for reasons of safety. This basin is placed below the reactor and acts as heat sink upon a tube rupture within the reactor enclosure. To fulfill this purpose the basin must not have too small a volume and the temperature of the water must be considerably lower than the temperature of the reactor, for example room temperature.

SUMMARY OF THE INVENTION

According to the invention a rapid shutting down of the reactor upon a network disconnection can be avoided by making the equipment so that the steam system of the reactor can be connected to the water basin in the reactor enclosure through a number of rapidly opening valves arranged to open immediately upon a sudden and relatively large load decrease in the turbine. By means of this arrangement the excess steam can, immediately after a disconnection of the network, be conducted away to the water basin where it is condensed so that the pressure increase in the steam system can be kept below the critical value for a rapid shutting down of the reactor.

The steam led off through the high-speed valves and flowing down into the basin of water causes the temperature of the water in the basin to increase. So that the basin can at all times fulfill the purpose for which, according to the above, it was originally intended, therefore, no more steam than necessary should be led off to the basin. The high-speed valves are therefore suitably arranged to open only momentarily upon a breakdown, after which the excess steam is led in a manner known per se through one or several dumping valves to the main condenser of the turbine. The latter part of the dumping means, however, can be made considerably smaller and more cheaply than in equipment where advantage is not taken of the heat sink in the water basin to conduct away steam during the first moments after a disconnection of the network.

Control of the plant upon a network disconnection is suitably arranged by means of a so-called dumping regulator arranged to give opening impulses to said high-speed and dumping valves, respectively, and bring about a reduction of the reactor power to a predetermined level.

Said high-speed valves may also be made to play the part of pressure safety valves in the reactor tank and in this way the total valve capacity installed is considerably reduced.

BRIEF DESCRIPTION OF THE DRAWINGS

The invention will be further explained by describing an embodiment with reference to the accompanying drawing in which FIGURE 1 shows schematically a nuclear power plant with a dumping means according to the invention, while

DESCRIPTION OF THE PREFERRED EMBODIMENT

Figure 1:
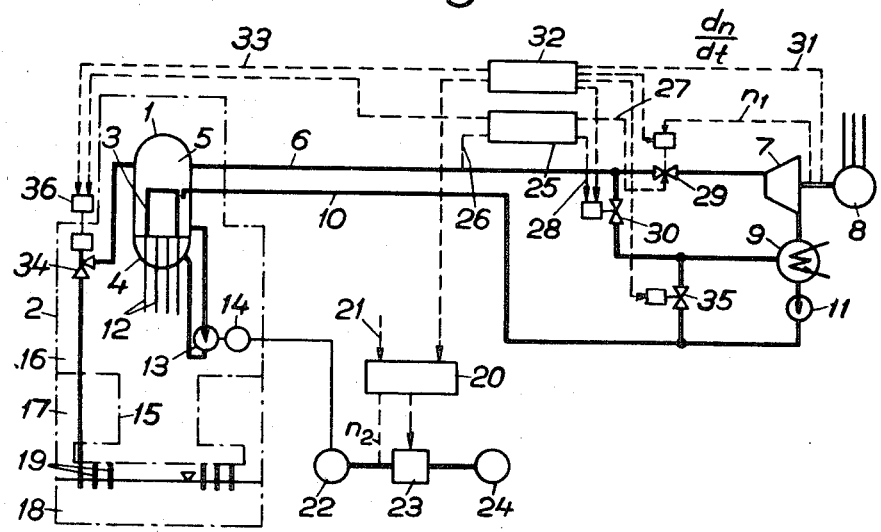

FIGURE 1 shows a nuclear reactor 1 which is arranged in a reactor enclosure 2 constructed of concrete. The reactor is a boiling water reactor, the coolant being light water. The reactor core 3 consists of a large number of fuel elements through which coolant flows from the water-filled space 4 under the reactor core. While flowing through the fuel elements the water is heated to the boiling point and the steam flows out into the steam space 5 above the reactor core. The steam is led from the steam space 5 through the main steam conduit 6 to a turbine 7 which drives an electric generator 8. The steam flowing out of the turbine is led into a condenser 9 where it condenses and the condensate is then pumped back to the reactor through the feed water conduit 10 with the help of condensate and feed water pumps 11. The power generated in the reactor can be controlled in two ways, by moving a number of absorber rods 12 and by altering the circulation through the reactor core with the help of a circulation pump 13 driven by a motor 14 having adjustable speed. The normal working pressure of the reactor may, for example, be 70 bar corresponding to a temperature of 286° C. for saturated water vapour.

The reactor enclosure 2 is divided by means of a wall 15 into an upper chamber 16 in which is the reactor 1 and a lower chamber 17 containing a basin 18 with water. A number of tubes 19 lead from the upper chamber 16 and open into the water basin 18, the primary purpose of which is to collect and cool water or steam flowing from the reactor upon a tube rupture within the reactor enclosure.

In normal operation the equipment is intended to provide a constant power for the electric network to which the generator 8 is connected. The desired power is set on a power regulator 20 by a manual operation symbolised by the arrow 21. Upon a difference between the actual power and the desired value, the speed $n_2$ of the three-phase generator 22 is influenced, this generator being driven, for example through a hydraulic connection 23, by a motor 24 having a constant speed. The pump motor 14 which is a squirrel-cage induction motor, is fed with adjustable frequency which means that the quantity of water circulated through the fuel core by the pump 13 is altered. This in turn causes an alteration in power generation in the reactor so that it corresponds to the desired value. The power also can be controlled by altering the portion of the absorber rods 12.

To keep the pressure in the steam system constant a pressure regulator 25 is arranged to sense the steam pressure by means of a connection 26. The pressure regulator can then, through the conduits 27 and 28, influence the turbine governor valve 29 in the main steam conduit 6 and the dumping valve 30, respectively, through which excess steam can be conducted away to the condenser 9 when the pressure becomes too high. The valve 30 is otherwise closed during normal operation, but is opened for starting and stopping.

Upon a sudden disconnection of the network the speed $n_1$ of the turbine 7 increases very rapidly, which is registered through a conduit 31 by a dumping regulator 32, which then sends impulses (orders) through a conduit 33 to a number of high-speed valves 34 arranged in the reactor enclosure 2 to open them. At the same time the valve 29 throttles the steam supply to the turbine, and the dumping regulator 32 sends impulses to the dumping valve 30 which is not so rapid as the valves 34, and furthermore to one or more valves 35, the purpose of which is to ensure that the steam flowing to the condenser is first mixed with water in order to lower the temperature. Furthermore, an impulse is simultaneously sent from the dumping regulator to the power regulator 20 to reduce the reactor power to a predetermined level, for example 50% of full load.

Figure 2:
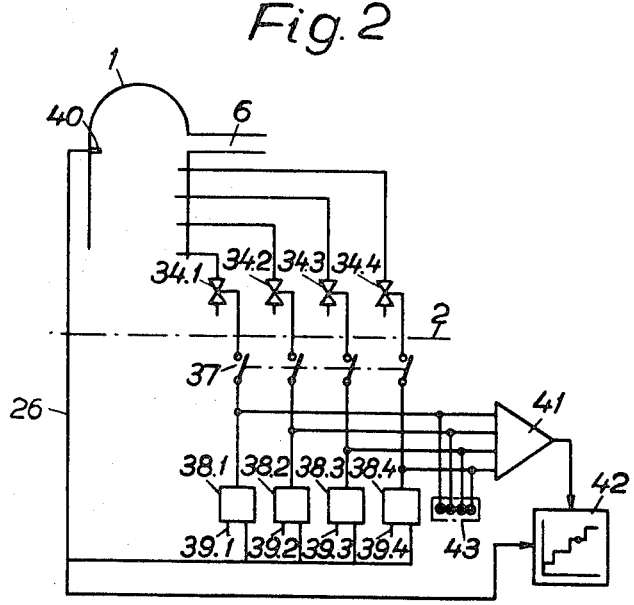
FIGURE 2 shows the valve control circuit.

Thus, according to the invention, during the first moments after a disconnection of the network the available heat sink in the water basin 18 of the reactor enclosure is utilized for dumping the excess steam through the high-speed valves 34. The control equipment for these valves is shown schematically in FIGURE 2 where the different valves are designated 34.1–34.4. Only four valves have been shown in the figure but in practice it is suitable to use for example 10–20. The valves are connected by means of switches 37 to individual level discriminators 38.1–38.4. The switches and level discriminators form the control unit 36 shown in FIGURE 1. Each level discriminator is fed through conduits 39.1–39.4 with a specific reference signal for each discriminator corresponding to a pressure close to the operating pressure of the reactor. From a pressure gauge 40 arranged in the steam system, furthermore, a signal proportional to the pressure in the steam system is carried through the conduit 26 to each level discriminator. When the signal from the pressure gauge 40 exceeds the reference signal for one level discriminator, a signal is obtained on the output of the discriminator. Upon a disconnection of the network the switches 37 are influenced to close and the signal from the level discriminator thus influences the respective valve 34 to open. When the tendency towards increased pressure has been stopped, an order is given to close the valves 34 and the dumping valve 30 takes over the pressure control (constant pressure maintenance). The transmission of pressure control to the dumping valve may take place as follows:

When the first pressure variation after a disconnection of the network has been compensated, mainly by the valves 34, and the pressure has started to approach a stable value, the control signals to the valves 34 are disconnected one by one, so that the total blow-out capacity is limited. Disconnection of the control signals may take place by opening the connectors 37 successively either automatically or manually. The tendency to increased pressure which thus occurs is counteracted by the dumping valve 30 which has a speed sufficient to compensate the small disturbances which arise when the valves 34 are successively closed. Since the reactor power has meanwhile considerably decreased due to the decreased speed of the circulator pumps 13, the dumping valve 30 can now take over the pressure control in spite of its limited capacity.

While the external electric network is disconnected the turbine operates as a so-called house-turbine, from which the necessary electrical energy can be obtained for the circulation pumps and other parts necessary to maintain the plant in operation. As soon as the breakdown in the electricity network has been rectified the equipment is thus ready for synchronization. The invention thus enables a nuclear power plant of this type to be utilized considerably more effectively than previously known plants in which a rapid shutting down of the reactor caused by a relatively short breakdown in the current supply has caused the plant to be out of operation for a considerable time.

For continuous control when no fault arises in the level discriminators their output terminaals are connected across a totalling amplifier 41 to, for example the y-connection of an xy-recorder 42, while the x-connection of the recorder is fed from the pressure gauge 40. If the equipment is faultless the registering means of the recorder should travel in a certain step-curve as shown in the figure. Of course other types of registering means for two signals may be used instead of an xy-recorder. In order upon a fault indication to be able to determine which of the level discriminators is faulty a lamp panel 43 is arranged.

For a reactor tank of the type in question a pressure safety device must always be provided and this is normally effected by means of separate safety valves which open at a higher pressure than operating pressure. However, with an arrangement according to the invention, this function can very well be fulfilled by the valves 34 intended for dumping so that specially arranged safety valves may be omitted.

As coolant in the reactor heavy or light water can in principle be used. However, due to its size only light water can be used for the water basin 18, and since during a dumping process quite a considerable quantity of coolant is lost due to its being mixed with the contents of the basin 18, it is most suitable from an economic point of view to use light water in the reactor also.

We claim:
1. Nuclear power plant comprising a reactor enclosure, a boiling water reactor arranged in said reactor enclosure, a turbine, a condenser connected to said turbine, a conduit for leading steam from said reactor to said turbine, an electric generator driven by said turbine, a plurality of dumping valves connected between said reactor and said condenser, a basin with water for emergency use arranged in said reactor enclosure below said reactor, the temperature of said water being considerably lower than the tem- perature in the reactor, wherein the improvement comprises a plurality of rapidly opening valves connected between said reactor and said water basin, means for momentarily opening said valves in response to a sudden and relatively large load decrease on said turbine in order to conduct steam from said reactor to said water basin, and means for opening said dumping valves after the momentary opening of said rapidly opening valves.

2. Nuclear power plant according to claim 1, in which a control means is provided responsive to said load decrease to bring about a reduction in the reactor power to a predetermined power level.

3. Nuclear power plant according to claim 1, in which said rapidly opening valves are arranged inside the reactor enclosure.

4. Nuclear power plant according to claim 1, in which the rapidly opening valves are provided with a control means for influencing the valves so that their total outlet capacity is dependent on the steam pressure in the reactor.

5. Nuclear power plant according to claim 4, in which the control means contains an individual level discriminator for each valve, and a switching device connecting said level discriminators.

6. Nuclear power plant according to claim 1, in which said rapidly opening valves constitute pressure relief valves for reactor tank.

7. Nuclear power plant according to claim 1, in which the coolant for the reactor consists of light water.

References Cited

UNITED STATES PATENTS

| | | | |
|---|---|---|---|
| 2,999,059 | 9/1961 | Treshow | 176—20 |
| 3,052,615 | 9/1962 | Johns et al. | 176—55 |
| 3,128,233 | 4/1964 | Kuerzel | 176—55 |
| 3,226,299 | 12/1965 | Hackney | 176—20 |

FOREIGN PATENTS

| | | |
|---|---|---|
| 796,164 | 6/1958 | Great Britain. |
| 878,097 | 9/1961 | Great Britain. |
| 992,033 | 5/1965 | Great Britain. |

OTHER REFERENCES

GER–1301, 1956, pp. 12, 17, 21–24.
Power, September 1955, pp. 75–81, by Staber.

BENJAMIN R. PADGETT, *Primary Examiner.*

H. E. BEHREND, *Assistant Examiner.*

U.S. Cl. X.R.

176—56